United States Patent [19]
Larkin et al.

[11] Patent Number: 5,085,383
[45] Date of Patent: Feb. 4, 1992

[54] CANOPY ASSEMBLY

[75] Inventors: John Larkin, Belfast; George Carlisle, deceased, late of Belfast, both of Ireland, by Ida Maude Carlisle, legal representative

[73] Assignee: Short Brothers PLC, Belfast, Northern Ireland

[21] Appl. No.: 345,851

[22] Filed: May 1, 1989

[30] Foreign Application Priority Data

Apr. 29, 1988 [GB] United Kingdom ............... 8810217

[51] Int. Cl.$^5$ .............................................. B64C 1/14
[52] U.S. Cl. .................................... 244/121; 52/584
[58] Field of Search ................ 244/121, 124.3; 52/584

[56] References Cited

U.S. PATENT DOCUMENTS

| | | | |
|---|---|---|---|
| 2,258,724 | 10/1941 | Wagner et al. | 244/121 |
| 2,349,630 | 5/1944 | Lesnick | 244/121 |
| 2,469,436 | 11/1944 | King | 244/121 |
| 2,652,996 | 9/1953 | Yujuico et al. | 244/121 |
| 2,808,355 | 10/1957 | Christie et al. | 52/208 |
| 2,834,998 | 5/1958 | Wilder | 244/121 |
| 2,939,186 | 6/1960 | Norwood et al. | 244/121 |
| 2,971,728 | 2/1961 | Martin | 244/121 |
| 3,618,881 | 11/1971 | Fellers | 244/121 |
| 3,630,472 | 12/1971 | Axenborg | 244/121 |
| 3,768,759 | 10/1973 | Martin | 244/121 |
| 4,324,373 | 4/1982 | Zibritosky | 244/121 |
| 4,905,935 | 3/1990 | Uram | 244/121 |

FOREIGN PATENT DOCUMENTS

| | | | |
|---|---|---|---|
| 167106 | 12/1954 | Australia | 244/121 |
| 203847 | 10/1955 | Australia | 244/121 |
| 1477244 | 6/1977 | United Kingdom | . |
| WO8601598 | 3/1986 | World Int. Prop. O. | . |

Primary Examiner—Michael J. Carone
Attorney, Agent, or Firm—Cushman, Darby & Cushman

[57] ABSTRACT

A canopy assembly for an aircraft includes a forward canopy panel and a rear canopy panel carried by a support frame. The canopy panels are mounted on the support frame by buttstraps. The bottom edges of the forward canopy panel and the rear canopy panel are set in a bed of sealing compound. A bed of a release agent prevents adhesion between the front part of the forward canopy panel and the bed.

The canopy panels are attached to one another at a central region by internal and external buttstraps. The adjacent parts of the panels are contained in beds of sealing compound, and a release agent is applied to said adjacent parts. The rear edge of the canopy panel and the front edge of the canopy panel are scalloped adjacent each clamping bolt.

In the event of a birdstrike the forward canopy panel deforms and moves locally rearwardly with respect to the aircraft fuselage. The central buttstraps may also move locally rearwardly with respect to the aircraft fuselage and rear panel.

13 Claims, 10 Drawing Sheets

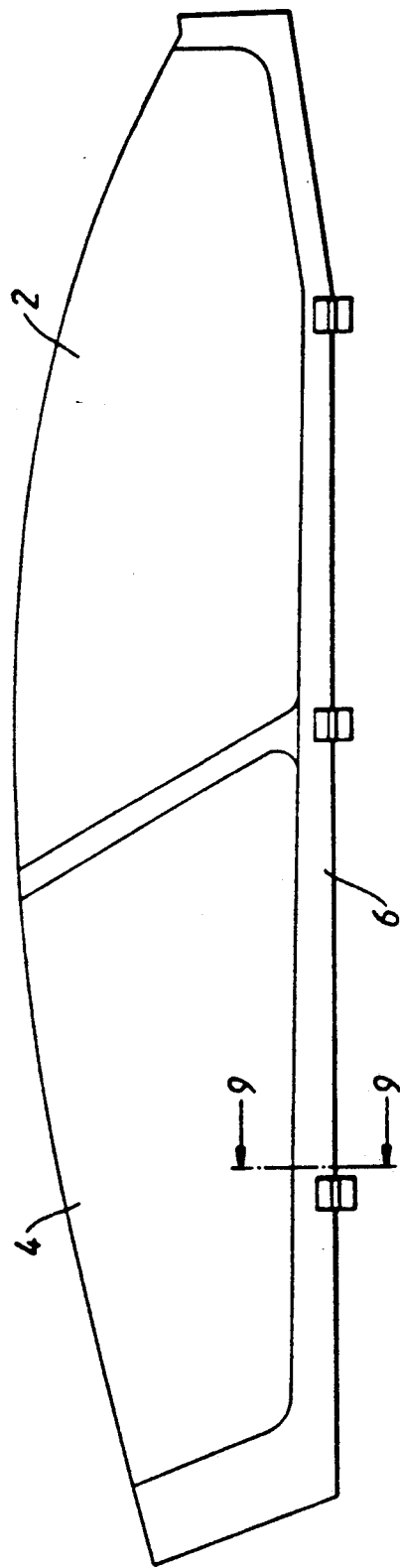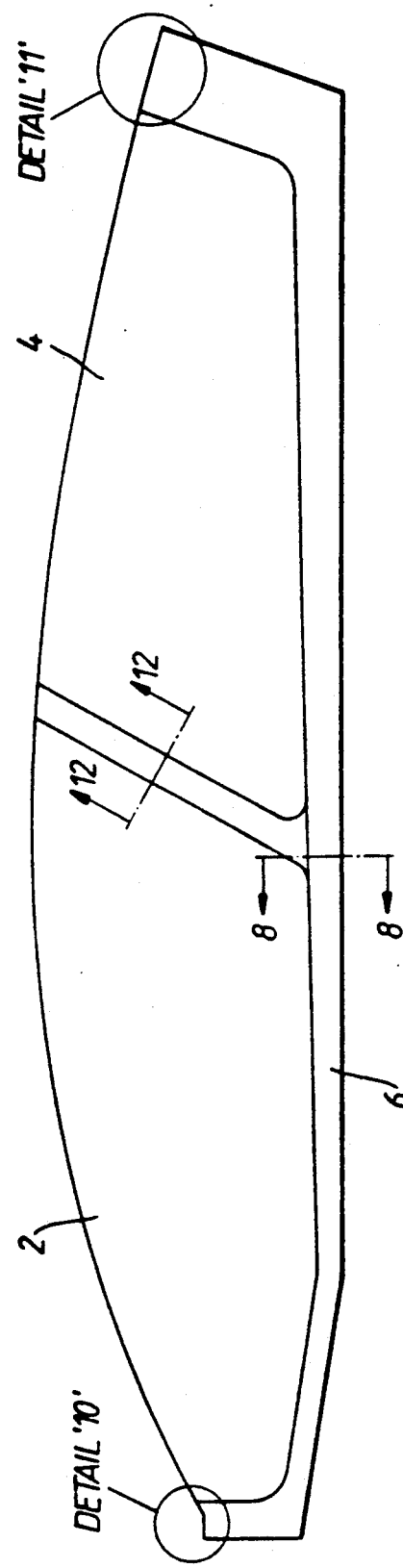

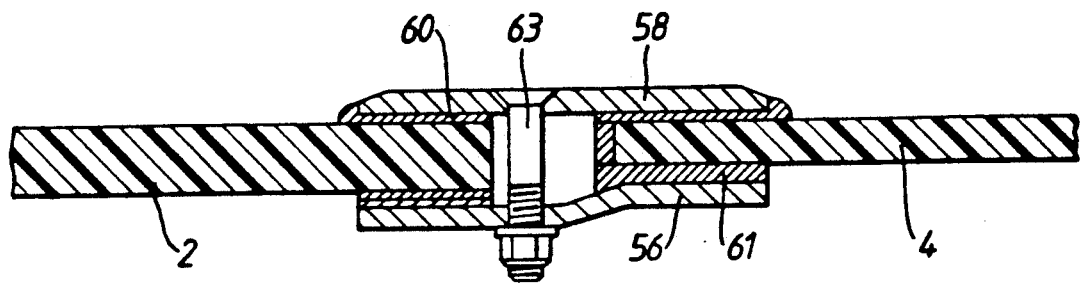
Fig.12.
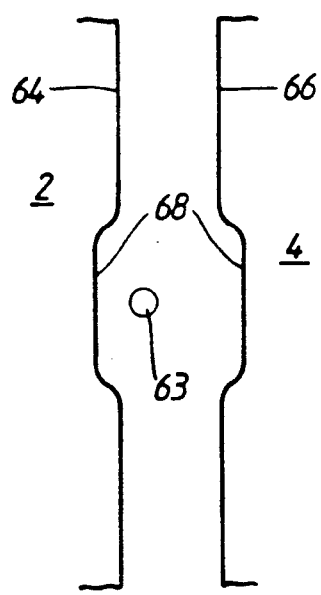 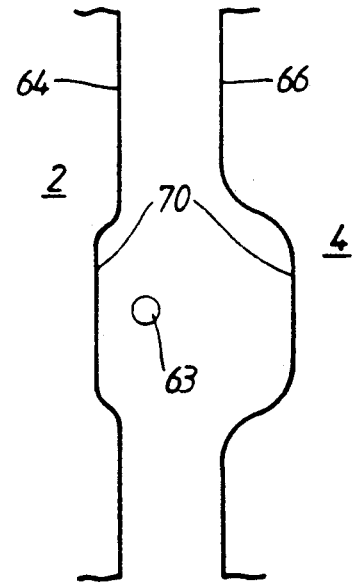
Fig.13. Fig.14.

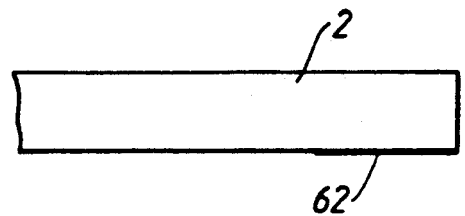
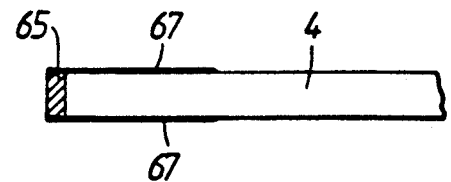
Fig.15(a). Fig.15(b).
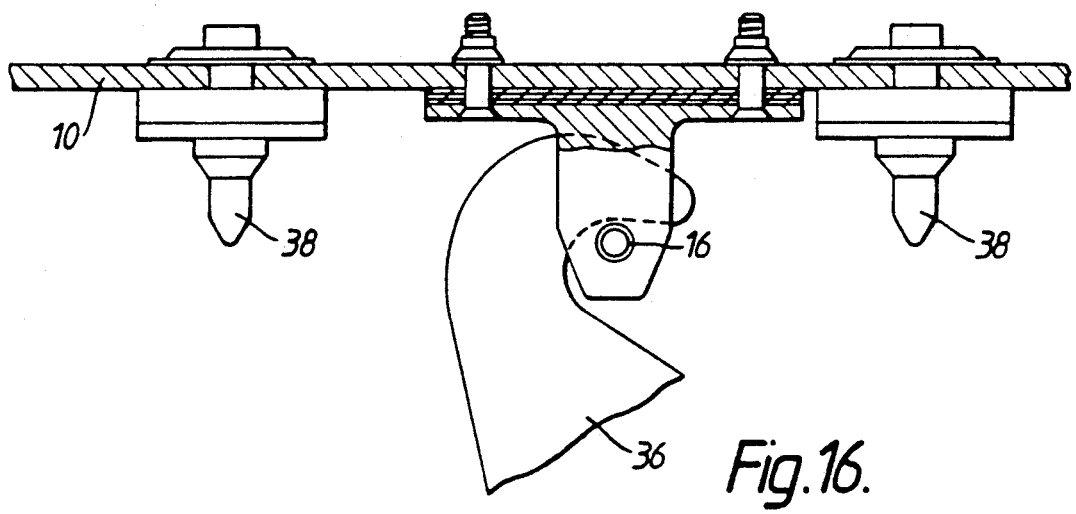
Fig.16.
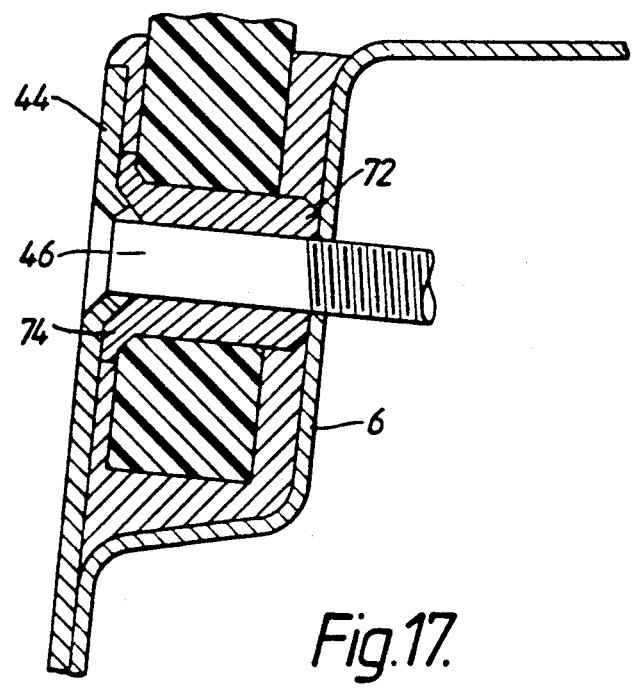
Fig.17.

CANOPY ASSEMBLY

The present invention relates to a canopy assembly which is suitable for use on an aircraft, and is particularly concerned with a canopy assembly which provides improved resistance to birdstrike.

On a small aircraft the pilot's canopy may take the form of a plastic blister.

The forward portion of a canopy can present a high sloping face, and it is a requirement of the Aircraft Certification Authorities that this portion of the canopy must resist penetration in the event of a birdstrike.

In the design of a canopy three of the major parameters that must be considered are as follows:
(1) pilot's vision
(2) resistance to birdstrike
(3) pilot's emergency ejection In order to minimise the distortion of the pilot's vision through the plastic blister the thickness of the canopy sheet is required to be kept to a minimum. In the event of a serious aircraft malfunction requiring the pilot to leave the aircraft, ejection is performed by the pilot and the seat bursting through the canopy. In consequence it is necessary to keep the canopy sheet thickness in the ejection path to a minimum. The difficulty arises that these two requirements conflict with the requirement to increase the canopy sheet thickness to improve bird strike resistance.

One accepted method of increasing the strength of the forward sloping face of a canopy is to introduce an arch frame. This frame is used as a joint member between a thicker forward canopy panel and a thinner rear canopy panel. With this type of design difficulties arise in preventing bird fragments from entering the cockpit at the joint between the frame and the canopy panels in the event of a strike. There is the additional difficulty that the introduction of the frame causes a reduction in the pilot's vision.

It is an aim of the invention to alleviate the above-mentioned difficulties.

According to a first aspect of the invention there is provided a canopy assembly comprising a canopy which is mounted on a support frame and which has a forward portion which is so constructed and secured to the support frame that the forward portion may locally move longitudinally with respect to the frame in the event of frontal impact.

The forward portion of the canopy may be clamped in position, and a suitable sealant may be applied between the inner and outer surfaces of the canopy forward portion and the clamp members. The sealant also acts as a cushion against mechanical shock. Furthermore, a suitable release agent may be applied to the forward edge of the forward portion of the canopy and those parts of the inner and outer surfaces of the canopy forward portion which are held by the clamp members.

In a preferred arrangement the forward portion of the canopy is clamped between a part of the support frame and a light alloy buttstrap.

According to a second aspect of the invention, there is provided a canopy assembly comprising a forward canopy panel and a rear canopy panel mounted on a support frame in which the rear part of the forward canopy panel and the forward part of the rear canopy panel are spaced from one another and secured to one another to allow relative longitudinal movement of the forward and rear canopy panels in the event of frontal impact.

According to a third aspect of the invention there is provided a canopy assembly according to the second aspect in which the forward canopy panel is so constructed and secured to the support frame that the said forward canopy panel may locally move longitudinally with respect to the frame in the event of frontal impact.

In a preferred arrangement a suitable sealing material is applied to the forward edge of the rear canopy panel. A release agent is then applied to the inner surface of the rear part of the forward canopy panel, and to the inner and outer surfaces of (i) the forward part of the rear canopy panel, and (ii) the sealing material on the forward edge of the rear canopy panel. Sealing material is then applied to the said release agent, and also to the outer surface of the rear part of the forward canopy panel.

The forward and rear canopy panels may be clamped to one another by inner and outer light alloy buttstraps secured together by bolts which pass through the gap between the forward and rear canopy panels. The rear edge of the forward canopy panel and the forward edge of the rear canopy panel may be scalloped to reduce the risk of splintering or fragmentation of the canopy panel edges by the bolts in the event of frontal impact.

A "buttstrap" is a plate or strip which overlaps the adjacent parts of members to be joined.

The forward canopy panel and central buttstraps may locally move together relative to the rear canopy panel.

Preferably, the forward canopy panel is thicker than the rear canopy panel in order to provide improved resistance to birdstrike.

One embodiment of the invention will now be described, by way of example, with reference to the accompanying illustrative drawings, in which:

FIG. 6 is a view of one side of the canopy assembly of FIG. 1;

FIG. 7 is a view of the other side of the canopy assembly of FIG. 1;

FIG. 12 is a section on the line 12—12 of FIG. 7;

FIGS. 13 and 14 are diagrammatic illustrations of different parts of the adjacent edges of the forward and rear canopy panels of the canopy assembly of FIG. 1;

Figure 1:
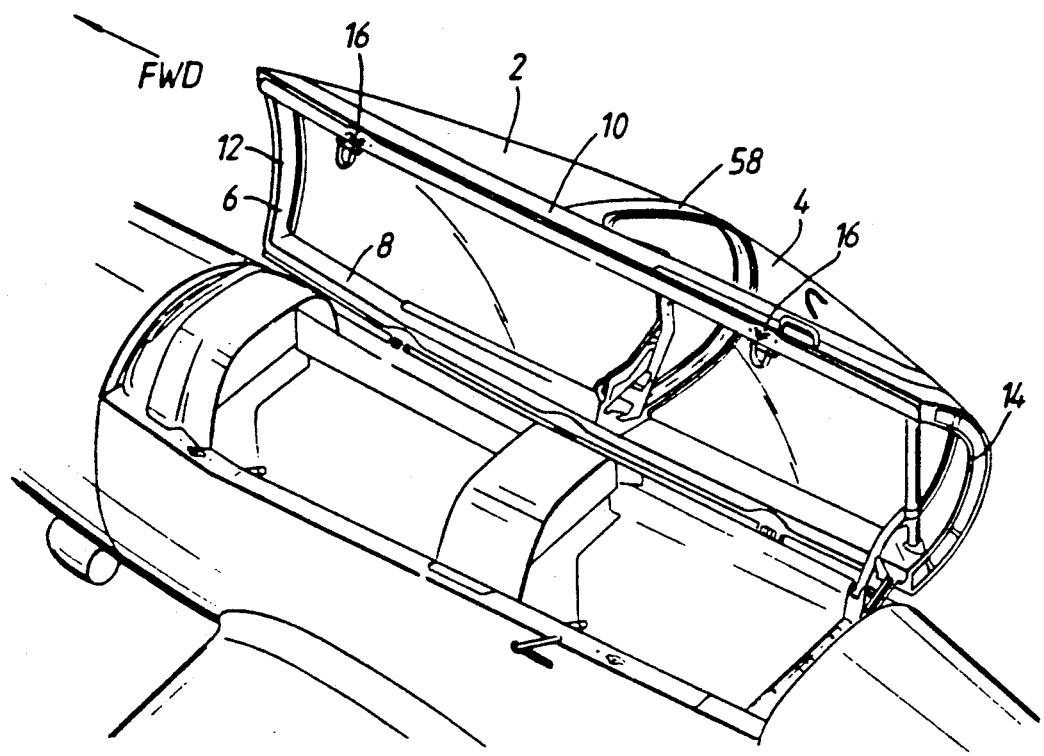
FIG. 1 is a perspective view from above of a canopy assembly in the open position.
Figure 8:
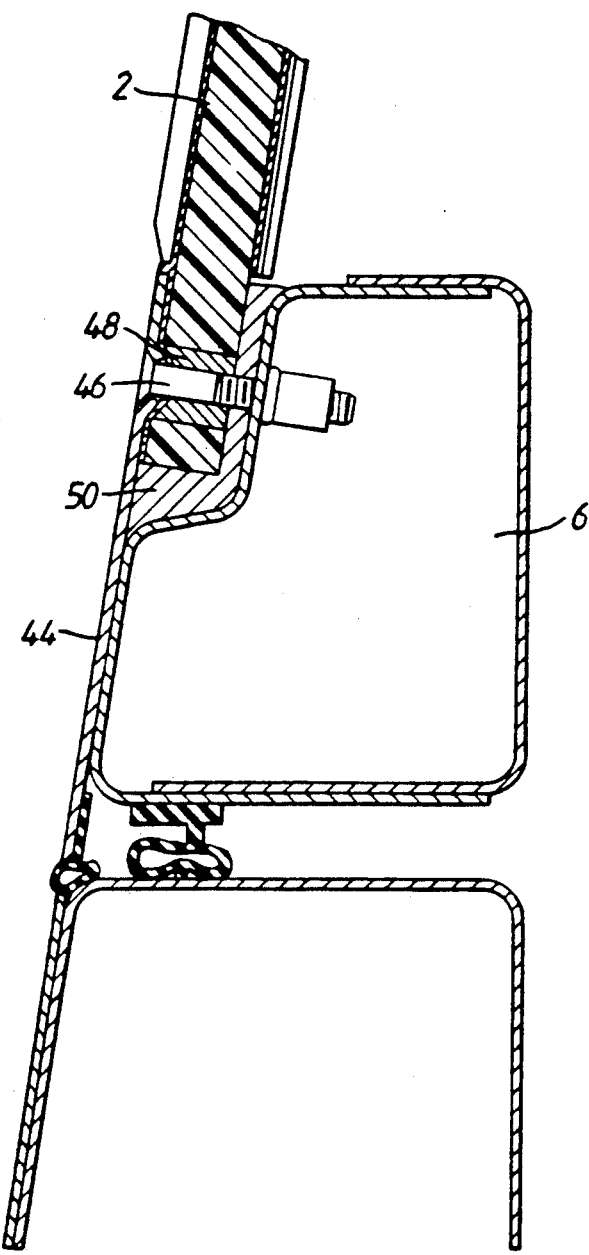
FIG. 8 is a section along the line 8—8 of FIG. 7.
Figure 9:
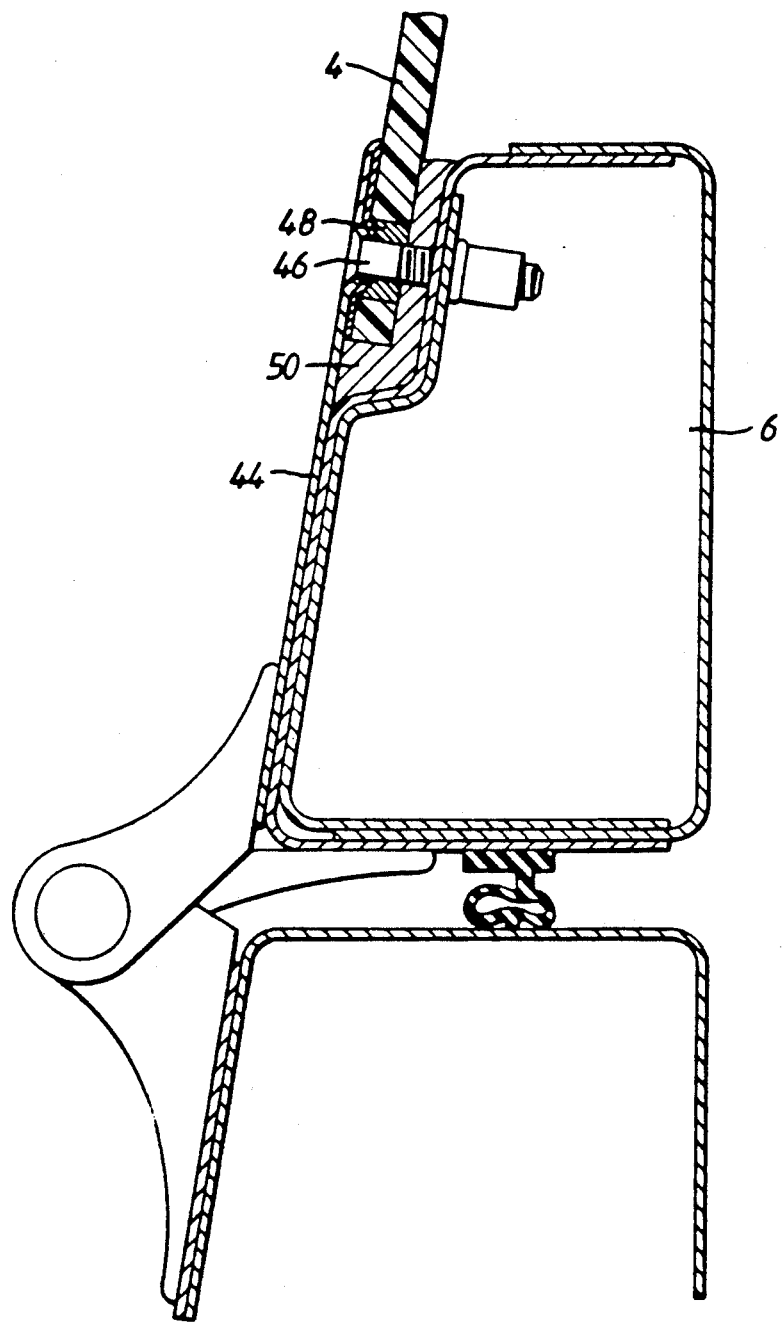
FIG. 9 is a section along the line 9—9 of FIG. 6.

FIGS. 15(a) and 15(b) are side elevations of the adjacent parts of the forward and rear canopy panels respectively;

FIG. 16 is a side elevation of one of the latches of the canopy assembly of FIG. 1; and FIG. 17 is a modification of the construction illustrated in FIGS. 8 and 9.

Figure 2:
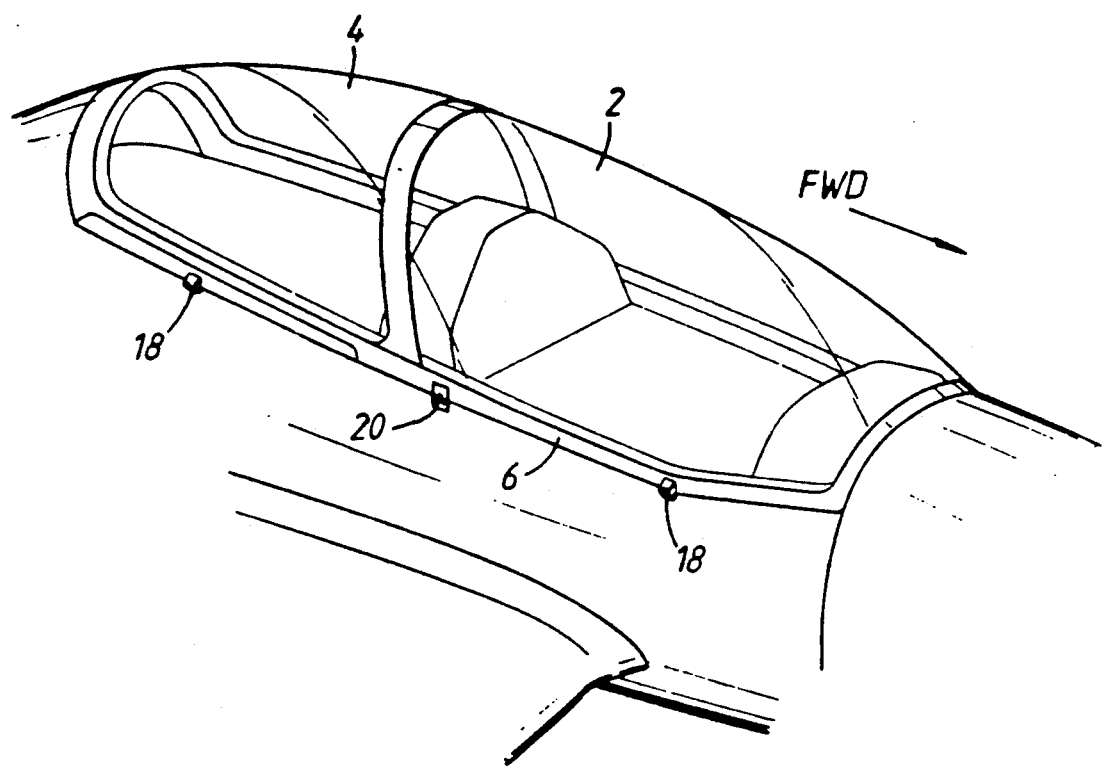
FIG. 2 is a perspective view from above of the canopy assembly of FIG. 1 in the closed position.
Figure 3:
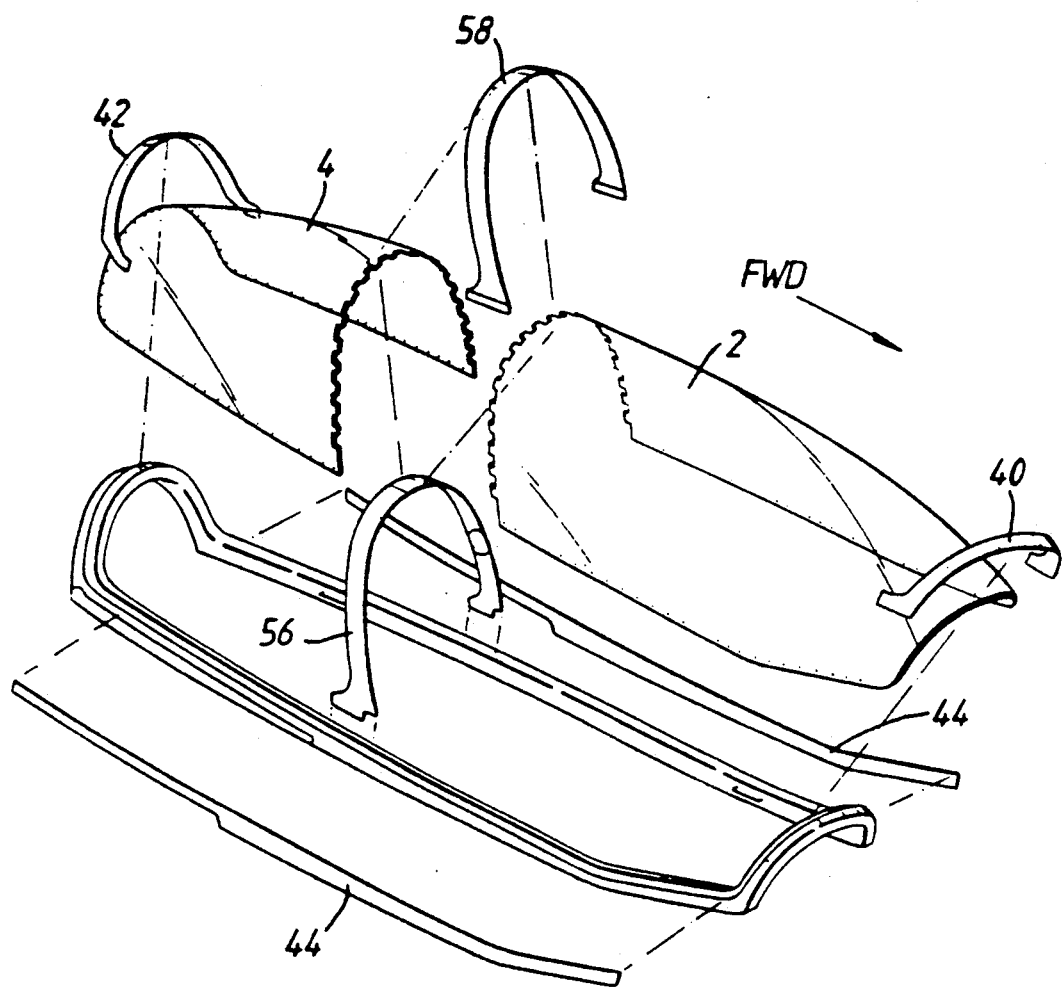
FIG. 3 is an exploded view of the canopy assembly of FIG. 1.

FIGS. 1 to 3 show a canopy assembly of the invention includes a forward canopy panel 2 and a rear canopy panel 4 which are a carried by a box-type support frame 6. The forward canopy panel 2 is of 10 mm thick stretched acrylic, and the rear canopy panel 4 is of 6 mm thick cast acrylic.

The support frame 6 consists of two longitudinal members 8 and 10 arranged to seat on longitudinal side members of an aircraft cockpit, and front and rear end members 12 and 14 which make a close fit with front and rear end members of the cockpit. One longitudinal member 8 of the frame is hinged to one side member of the cockpit so that the canopy can be pivoted transversely to gain access to or exit from the cockpit. The other longitudinal member 10 of the frame can be latched to the appropriate side member of the cockpit to secure the canopy assembly in the closed position.

More particularly, the support frame 6 is supported by three hinges on the starboard side of the aircraft and by two latch pins 16 on the port side as illustrated in FIGS. 1 and 2. The forward and rear hinges 18 are of the type illustrated in FIG. 4, and the central hinge 20 is of the type illustrated in FIG. 5.

Figure 4:
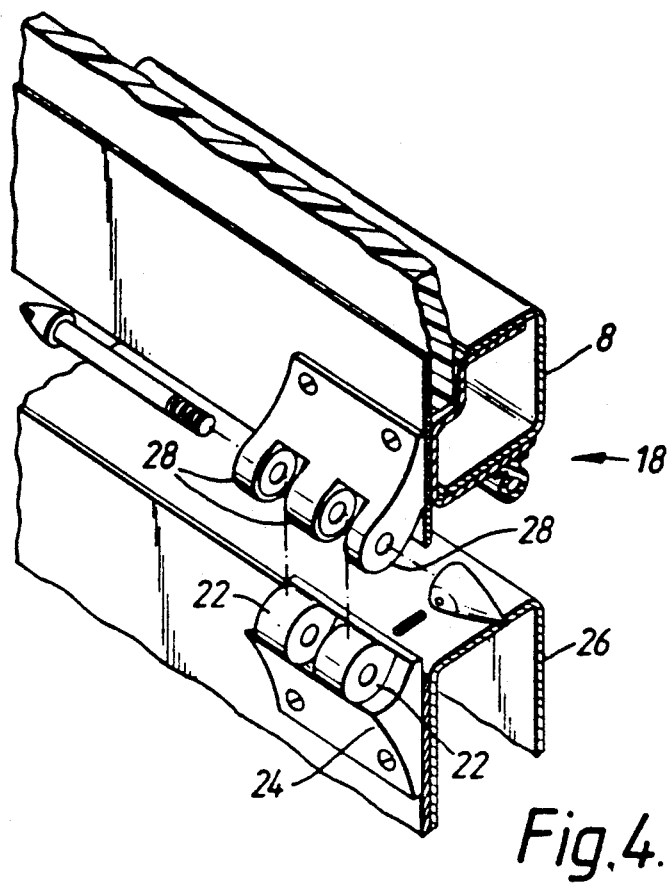
FIGS. 4 and 5 are perspective views from above of the hinges of the canopy assembly of FIG. 1.

FIG. 4 shows how each hinge 18 includes two lower hinge members 22 formed integrally with a bracket 24 secured to a side member 26 of the cockpit. Three upper hinge members 28 are secured to the frame member 8, and are pivotally attached to the lower hinge members 22 by a hinge bolt and nut.

Figure 5:
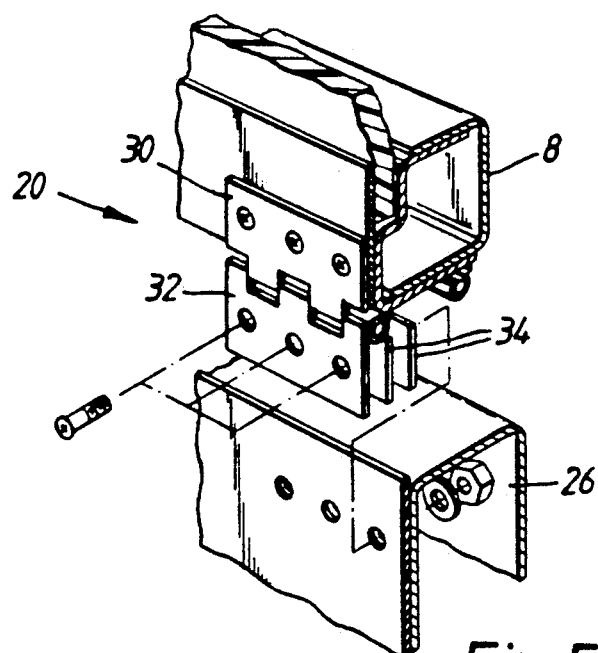

FIG. 5 shows how the central hinge 20 comprises pivotally connected hinge plates 30 and 32 secured to the frame member 8 and the cockpit side member 26 respectively. Shims 34 can be used to ensure appropriate mounting of the hinge to the cockpit side member 26.

The operating mechanism of the latches, as illustrated in FIG. 16, comprises two hooks 36 contained within the aircraft fuselage. To close the canopy, each of the two hooks 36 is caused to engage with a respective one of two pins 16 located on the underside of the longitudinal member 10 of the the support frame 6.

Pairs of spigots 38 are attached to the underside of the longitudinal member 10 of the support frame 6, the spigots of each pair being fore and aft of a respective latch pin 16. These spigots 38 engage appropriate sockets in the cockpit side member to secure the support frame 6 against lateral and/or fore and aft movement of the frame relative to the fuselage.

The forward and rear canopy panels 2 and 4 are mounted on the support frame 6 by an external light alloy buttstrap arrangement. As illustrated in FIG. 3, for manufacturing convenience the external buttstrap arrangement is made in four parts; a front buttstrap 40, a rear buttstrap 42 and two side buttstraps 44.

Figure 11:
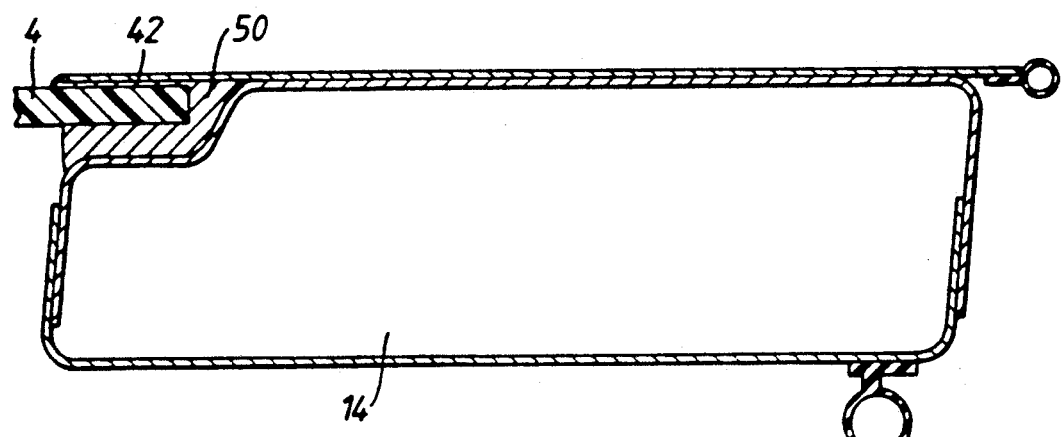
FIG. 11 is an enlargement of the "Detail 11" of FIG. 7.

As seen is FIGS. 8, 9 and 11, the bottom edge of the sides of the forward canopy panel 2 and the bottom edge of the sides and rear of the rear canopy panel 4 are set in a bed 50 of sealing compound between the support frame 6 and the corresponding external buttstrap. The bed 50 is 0.5 mm in thickness between the canopy panels and the buttstrap and extends to the upper edge of the buttstrap.

Furthermore, the bottom edge of the forward canopy panel 2 and the bottom edge and the rear edge of the rear canopy panel 4 are secured to the support frame 6 by a series of bolts 46 spaced at intervals of approximately 4 cm from one another. Each bolt passes through the external buttstrap, the sealant bed 50, a neoprene bush 48 in the canopy panel and through the outer side of the box-type support frame 6. FIG. 11 is a section taken through a position remote from a bolt.

Figure 10A:
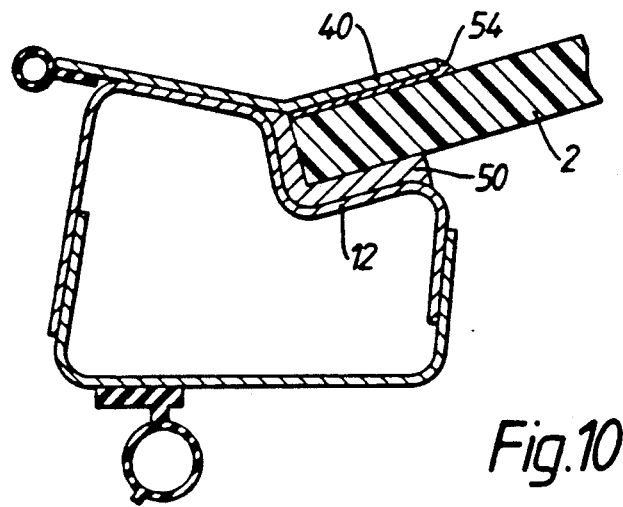
FIG. 10(a) is an enlargement of the "Detail 10" of FIG. 7.

FIG. 10(a) shows how the bottom edge of the front part of the forward canopy panel 2 is set in the bed 50 of sealing compound, and is retained in position by the clamping action of the buttstrap 40 and the front end 12 of the support frame 6.

Figure 10B:
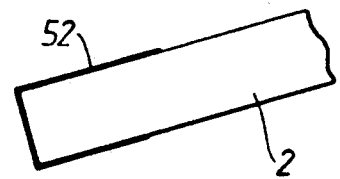
FIG. 10(b) is an enlargement of part of the "Detail 10" of FIG. 7.

FIG. 10(b) shows the forward canopy panel 2 when displaced from the support frame front end 12. As shown, a bed 52 of a release agent is applied to the inner and outer surfaces and the front edge of the forward canopy panel 2. This release agent is applied to extend rearwardly on the outer surface of the forward canopy panel 2 to the rearward extent of the external buttstrap 40, and to extend rearwardly along the inner surface of the forward canopy panel 2 to the rearward extent of the support frame front end 12. In consequence the release agent lies between and prevents adhesion between the front part of the forward canopy panel 2 and the sealing compound of bed 50. It will also be seen from FIG. 10(a) that this sealing compound is also applied between the rearward edge 54 of the external buttstrap 40 and the canopy panel 2.

As seen in FIGS. 12 and 15, the forward and rear canopy panels 2 and 4 are attached to one another at a central region of the canopy assembly by the clamping action of internal and external light alloy buttstraps 56 and 58. As will be seen in FIG. 3, the internal buttstrap 56 is in three pieces and consists of a left-hand piece, a right-hand piece and an upper piece joined together by further buttstraps on the inner sides of the buttstrap pieces. The external buttstrap 58 is in one piece and its leading and trailing edges are chamfered. Each chamfer is 1.5 mm deep and 3 mm wide. The rear part of the forward canopy panel 2 and the front part of the rear canopy panel 4 are contained in beds 60 and 61 of sealing compound (shown hatched in FIG. 12) and are retained in position by the clamping action of the buttstraps.

As shown in FIG. 15(a), a bed 62 of a release agent is applied to the inner surface of the rear part of the forward canopy panel 2 so as to extend between the rear edge of the forward canopy panel 2 and the forward part of the internal buttstrap 56. No release agent is applied to the outer surface or the rear edge of the forward canopy panel 2.

As further illustrated in FIG. 15(b), a buffer 65 of sealing compound is first applied to the forward edge of the rear canopy panel 4. This buffer 65 of sealing compound extends forwardly by 2.5 mm from the forward edge of the rear canopy panel 4 to prevent the adjacent edges of the forward and rear canopy panels 2 and 4 from coming into contact during a birdstrike.

As best seen in FIG. 15(b), a release agent 67 is applied to the inner and outer surfaces of the front part of the rear canopy panel 4 and to the inner and outer surfaces of the sealing compound buffer 65, and is arranged to extend from the forward edge of said buffer 65 to the rearward edges of the inner and outer buttstraps 56 and 58.

FIG. 12 shows how the beds 60 and 61 of sealing compound are applied to the beds 62 and 67 of release agent and to the outer surface of the rear part of the forward canopy panel 2. Fillets of sealing compound are also applied along the chamfered leading and trailing edges of the external buttstrap 58.

The forward and rear canopy panels 2 and 4 are held together by the clamping action of the internal and external central buttstraps 56 and 58. The clamping force is maintained by nineteen equally spaced bolts 63 (FIG. 12) which are spaced symmetrically about a vertical plane passing through the fore-and-aft centerline of the aircraft. The bolts 63 pass through the internal and external buttstraps 56 and 58 and pass through the space between the rear edge of the forward canopy panel 2 and the front edge of the rear canopy panel 4.

As seen in FIGS. 13 and 14, the rear edge 64 of the forward canopy panel 2 and the front edge 66 of the rear canopy panel 4 are scalloped at the location of each bolt 63. FIG. 13 illustrates the form of the scalloping 68 for the lower seven bolts on each side of the canopy, and FIG. 14 shows the form of scalloping 70 for the upper two bolts on each side of the canopy, and for the top bolt.

The scallops are each 15 mm long and extend substantially parallel to the canopy edges, each scallop being disposed symmetrically about its associated bolt. The two end portions of each scallop are shaped so as to blend smoothly into the adjacent edge of its canopy panel.

On the rear edge 64 of the forward canopy panel 2, the scallops are 2.5 mm deep, and on the front edge 66 of the rear canopy panel 4, the lower seven scallops on each side are also 2.5 mm deep. Also, on the rear canopy panel 4, the bases of the upper two scallops on each side and of the top scallop are located so that the distance between the rear edge of the adjacent bolt shank and the base of the scallop is at least 1 mm greater than the distance between the unscalloped adjacent edge portions of the forward and rear canopy panels. In addition, the base of each scallop 70 on the rear canopy panel 4 is at least 9 mm behind the canopy edge 66 as illustrated in FIG. 14.

One example of a suitable sealing compound is the compound known as PR1422. PR1422 is a two-part polysulphide, room-temperature-curing rubber compound available in two classes; class A brush application liquid and class B thixotropic non-slumping paste. This compound is manufactured by Berger Elastomers, Newcastle-upon-Tyne under licence from Products Research and Chemical Corporation, Los Angeles, U.S.A.

One example of a suitable release agent is a buffer fluoro-carbon dispersion of 5% solids in evaporated solvents. Marketed under the name "Mold Wiz F57", it is manufactured by Wertz of Industriegebiet, 6350 Bingen-Sponshein, W. Germany and supplied by GRP Materials Supplies Ltd., 4 Baron Avenue, Kettering, Northants. It is applied as a thin liquid which dries leaving a residue and does not have an engineering thickness as such.

In the event of a birdstrike upon the forward canopy panel 2, the mounting illustrated in FIG. 10(a) enables the forward canopy panel 2 to deform and locally move rearwardly with respect to the aircraft fuselage. In addition, the central buttstraps may move locally rearwardly with respect to the aircraft fuselage and rear canopy panel. The central mounting assembly of the forward and rear canopy panels 2 and 4, as illustrated in FIGS. 12 and 15, and the scalloping of the adjacent edges of the forward and rear canopy panels 2 and 4, as illustrated in FIGS. 13 and 14, enable the forward canopy panel 2 upon impact locally to move rearwardly with respect to the rear canopy panel 4 without contacting the securing bolts, thereby avoiding splintering or fragmentation of the canopy panel at the central joint.

The additional thickness of the forward canopy panel over the rear canopy panel provides the required additional strength to prevent penetration following a birdstrike.

The shaping and dimensions of the external front and central buttstraps and the provision of the sealing compound prevent cockpit penetration by fragments of a bird upon impact.

The absence of release agent on the rear edge of the forward canopy panel further prevents cockpit penetration by fragments of a bird upon impact by allowing good adhesion between the forward canopy panel and the sealing compound and the external central buttstrap.

As seen in FIG. 8, the part of the sealing compound bed 50 between the forward canopy panel 2 and the support frame 6 is nominally 3 mm thick. The part of the bed 50 between the panel 2 and the buttstrap 44 is greater than or equal to 0.5 mm in thickness.

As seen in FIG. 9, the part of the bed 50 between the rear canopy panel 4 and the support frame 6 is nominally 3 mm thick. The part of the bed 50 between the panel 4 and the buttstrap 44 is greater than or equal to 0.5 mm.

As seen in FIG. 10(a), the part of the bed 50 between the panel 2 and the buttstrap 40 is greater than or equal to 0.5 mm in thickness. The part of the bed 50 between the panel 2 and the frame end 12 is approximately 3 mm in thickness.

As seen in FIG. 11, the part of the bed 50 between the panel 4 and the buttstrap 42 is greater than or equal to 0.5 mm in thickness. The part of the bed 50 between the panel 4 and the frame member 14 is approximately 3 mm thick.

As seen in FIG. 12, the thickness of the part of the bed 60 between the panel 2 and the buttstrap 56 is in the range from 0.5 to 1.5 mm. The part of the bed 60 between the panel 2 and the buttstrap 58 is less than or equal to 0.5 mm in thickness. The part of the bed 61 between the panel 4 and the buttstrap 56 is greater than or equal to 2.5 mm in thickness. The part of the bed 61 between the panel 4 and the buttstrap 58 is less than or equal to 0.5 mm in thickness.

The above dimensions are given by way of example.

As seen in FIG. 17, each bush 48 illustrated in FIGS. 8 and 9 may be replaced by a bush 72 having an end flange 74 abutting the inner rim portion of the buttstrap 44. This bush 72 may have a length greater than the thickness of the forward and rear canopy panels 2 and 4, and the inner end of the bush may abut the support frame 6. The bush 72 may be made of silicone, neoprene or any other suitable material.

We claim:

1. A canopy assembly comprising a canopy, a support frame, a clamp member, and a release agent, wherein the canopy is mounted on the support frame and has a forward portion which has inner and outer surfaces and a forward edge and wherein said forward portion is secured to the support frame by said clamp member and the release agent is applied to the forward edge and to those parts of the inner and outer surfaces which are held by the clamp member so as to allow local longitudinal movement of said forward portion with respect to the support frame in the event of frontal impact.

2. A canopy assembly comprising a forward canopy panel having a rear part and a forward part, and a rear canopy panel having a forward part and a rear part, mounted on a support frame in which the rear part of the forward canopy panel and the forward part of the rear canopy panel are spaced from one another and secured to one another to allow relative longitudinal movement of the forward and rear canopy panels in the event of frontal impact.

3. A canopy assembly as claimed in claim 2, wherein the forward portion of the forward canopy panel is clamped in position.

4. A canopy assembly as claimed in claim 3, and further comprising clamp members, wherein the forward portion of the forward canopy panel has inner and outer surfaces and a suitable sealant is applied between the inner and outer surfaces of the forward portion of the forward canopy panel and clamp members.

5. A canopy assembly as claimed in claim 2 wherein the forward portion of the forward canopy panel is clamped between a part of the support frame and a buttstrap.

6. A canopy assembly as claimed in claim 2, wherein a suitable sealing material is located on the forward edge of the rear canopy panel to act as a buffer.

7. A canopy assembly as claimed in claim 2, and further comprising central buttstraps, wherein the forward and rear canopy panels are clamped to one another by inner and outer light alloy buttstraps secured together by bolts which pass through the gap between the forward and rear canopy panels.

8. A canopy assembly as claimed in claim 2, wherein the forward canopy panel is thicker than the rear canopy panel to provide improved resistance to birdstrike.

9. A canopy assembly comprising:
clamp members;
a forward canopy panel being mounted on a support frame and having a rear part and a forward part, the forward part having
inner and outer surfaces and suitable sealant applied between the inner and outer surfaces of said forward part of said forward canopy panel and a number of said clamp members holding portions of the inner and outer surfaces of said forward part to clamp said forward canopy panel in position;
a forward edge and a suitable release agent applied to the forward edge of said forward part of said forward canopy panel, and those parts of said inner and outer surfaces of said forward part of said forward canopy panel which are held by said clamp members; and
a rear canopy panel having a forward part and a rear part and being mounted on said support frame in which said rear part of said forward canopy panel and the forward part of the rear canopy panel are spaced from one another and secured to one another to allow relative longitudinal movement of said forward and the rear canopy panels in an event of frontal impact.

10. A canopy assembly comprising:
a forward canopy panel being mounted on a support frame and having a rear part and a forward part, a release agent being located on an inner surface of the rear part of the forward canopy panel; and
a rear canopy panel having a forward part and a rear part and being mounted on said support frame in which said rear part of said forward canopy panel and the forward part of the rear canopy panel are spaced from one another and secured to one another to allow relative longitudinal movement of said forward and the rear canopy panels in an event of frontal impact.

11. A canopy assembly as in claim 10 wherein a release agent is located on said inner and outer surfaces of said forward part of said rear canopy panel and sealing material on said forward edge of said rear canopy panel.

12. A canopy assembly as in claim 11, wherein sealing material is applied to said release agent, and also to an outer surface of said rear part of said forward canopy panel.

13. A canopy assembly comprising:
a forward canopy panel being mounted on a support frame and having a rear edge, a rear part and a forward part, the rear edge being scalloped to reduce a risk of splintering or fragmentation of the rear edge by bolts in an event of frontal impact;
a rear canopy panel having a forward edge, a forward part, and a rear part and being mounted on said support frame in which said rear part of said forward canopy panel and the forward part of the rear canopy panel are spaced from one another and secured to one another to allow relative longitudinal movement of said forward and the rear canopy panels in said event of frontal impact, the forward edge of the rear canopy panel being scalloped to reduce said risk of splintering or fragmentation of the forward edge of the rear canopy panel by said bolts in the event of frontal impact; and
an inner and outer buttstraps secured together by bolts which pass through a gap between said forward and said rear canopy panels, the inner and the buttstraps clamping said forward and rear canopy panels together.

* * * * *